United States Patent [19]
Helfrich et al.

[11] Patent Number: 5,686,767
[45] Date of Patent: Nov. 11, 1997

[54] APPORTIONING MINIMAL STANDBY POWER

[75] Inventors: Kenneth Jay Helfrich, Fishers; Paul Dishaun Henry, Carmel; Kevin Eugene Nortrup, Fairland, all of Ind.

[73] Assignee: Thomson Consumer Electronics, Inc., Indianapolis, Ind.

[21] Appl. No.: 366,076

[22] Filed: Dec. 29, 1994

[51] Int. Cl.[6] .................................................. H02J 7/00
[52] U.S. Cl. .............................. 307/64; 307/85; 364/707; 365/229
[58] Field of Search .............................. 307/64, 65, 66, 307/43, 85, 86; 364/492, 707; 395/750; 365/226, 227, 228, 229

[56] References Cited

U.S. PATENT DOCUMENTS 5,404,546  4/1995  Stewart ........................... 364/707

Primary Examiner—William M. Shoop, Jr.
Assistant Examiner—Jonathan Kaplan
Attorney, Agent, or Firm—Joseph S. Tripoli; Joseph J. Laks; Marion P. Metelski

[57] ABSTRACT

A method and apparatus for apportioning standby power implements a first transition mode between standby and run modes of operation in which a control circuit is energized by a standby power supply in a fully active state and generates an on/off command signal responsive to detection of an input signal and a second transition mode between the standby and run modes of operation in which the control circuit is energized by the standby power supply in a partially active state and generates the on/off command signal and a drive signal generator is fully energized by the standby supply. An intermediate transition mode may also be implemented between the first and second transition modes, in which the control circuit and the generator are both energized in a fully active state for a brief interval by the standby power supply and an auxiliary energy source.

15 Claims, 4 Drawing Sheets

APPORTIONING MINIMAL STANDBY POWER

BACKGROUND OF THE INVENTION

1. Field of the Invention

The invention relates to the field of managing power supplies and powered devices, and in particular, to minimizing power requirements and energy dissipation in standby modes of operation.

2. Description of Related Art

Many television receivers and similar devices draw standby power from the power mains to which they are connected, even when turned "off." Standby power is needed at least to power switching circuits responsive to user input devices such as an infrared remote control receiver and/or a front panel on/off switch, that cause the receiver to switch into the operational run mode when required.

The number of loads powered by the standby power supply is generally kept to a minimum to avoid unnecessary power dissipation when a television receiver or video recorder, for example, is not in use. The power needed from the standby supply is thus minimized, which minimizes power dissipation. Certain practical limits have been assumed to apply, for example, requiring enough standby power to energize a microprocessor in a run state; a remote control receiver, a switch panel array and all horizontal drive circuitry necessary to initiate a run mode. It is desirable from a design and efficiency point of view to reduce standby power levels, for example to not more than five watts. There may be no choice in the future, as standby power levels of not more than two watts, for example, are now under consideration by regulating authorities.

In a typical television receiver, a bridge rectifier provides an unregulated B+ DC supply voltage to the primary winding of the flyback transformer. This signal is not loaded in the absence of horizontal deflection drive signals for energizing the flyback transformer. Regulated run mode power is produced on the secondary windings of the flyback transformer from horizontal drive signals at the horizontal scanning frequency, coupled to the flyback transformer via a horizontal output transistor. A rectified run mode supply voltage from the secondary windings can be coupled to the standby power supply via a blocking diode, to power the control circuit and other standby loads from the flyback transformer when in the run mode.

The horizontal drive signals to the horizontal output transistor are derived in the run mode from the received video signal. These drive signals are generated by an oscillator which is synchronized with horizontal synchronizing signals from a received video signal. The oscillator will free run responsive to a turn on command from the microprocessor resulting in generation of horizontal drive signals for switching the horizontal output transistor. Accordingly, operation of the run mode power supply in the horizontal deflection circuit can begin during the free running mode of the oscillator. Sufficient standby power must be available to produce horizontal drive signals during the transition whatever the source, until run mode power is available. Standby power must also be available for biasing the buffer and driver stages of the horizontal output transistor.

SUMMARY OF THE INVENTION

The invention is based on a recognition that the conventional wisdom regarding the number of circuits which must be energized during standby modes of operation is not sound. In particular, for example, it is not necessary to provide enough standby power to energize both a microprocessor in a run state and all horizontal drive circuitry necessary to initiate a run mode, except perhaps for a very brief interval, in addition to the remote control receiver and the switch panel array.

In accordance with an inventive arrangement, the standby power supply must energize either a control circuit in a fully active state or the horizontal drive circuitry necessary to initiate a run mode, while operating both at the same time for as short an interval as possible. While in the standby mode, the control circuit is in a substantially fully active state. At the beginning of a transition into the run mode, the control circuit turns on the one-chip. The control circuit turns on the one-chip by setting a latch. The output of the latch operates a switch which couples standby power supply to the one-chip. After the latch is set, the control circuit transmits a command to the one-chip over a data bus to initiate operation of the horizontal drive circuitry in the one-chip. After the command has been sent, the control circuits assumes a quiescent polling/wait state, so that enough standby power will be available for the horizontal drive circuitry. The time interval during which both the control circuit and the one-chip are fully energized is very short. To the extent that the standby power supply cannot supply enough energy during the brief interval, an auxiliary, energy source can be utilized. Such an energy source may be a capacitor, charged by the standby power supply during the standby mode. The latch remains energized in the quiescent state of the controller. As the transition is completed into the run mode, the run mode power supply substitutes for the standby mode supply in energizing the horizontal drive circuitry and the control circuit.

The microprocessor can have a run-sense input coupled to the run mode power supply. As the run mode power supply becomes active, the microprocessor responds to the run-sense input and initiates operation in the run mode. Operation in the run mode includes an orderly commencement of operations. Orderly commencement can include setting preliminary buffer values and control settings.

A system for apportioning standby power, in accordance with an inventive arrangement, comprises: a generator for a drive signal; a run mode power supply operable in response to the drive signal; a standby power supply; and, a control circuit for generating an on/off command responsive to an input signal, the control circuit implementing a first transition mode between standby and run modes of operation in which the control circuit is energized by the standby power supply in an active state and generates the on/off command signal and a second transition mode between the standby and run modes of operation in which the control circuit is energized by the standby power supply in a partially active state and generates the on/off command signal and the drive signal generator is fully energized by the standby supply.

The control circuit may also implement an intermediate transition mode, between the first and second transition modes, in which the control circuit and the generator are both energized in a fully active state for a brief interval. An auxiliary energy source may supply additional energy during the intermediate transition mode. The auxiliary energy source may comprise a capacitor.

The control circuit may comprise: a microprocessor, having at least one input terminal coupled for receiving the input signal, when present, and having a latched output, which can be maintained in the partially active state, for generating the on/off command signal; and, a switch coupling the standby power supply to the generator responsive to the on/off command signal.

A method for transitioning from a standby mode of operation to a run mode of operation, in accordance with another inventive arrangements, comprises the steps of: (a.) polling input terminals of a control circuit energized by a standby power supply and operating in an active state; (b.) generating a first control signal responsive to a detected signal at one of the polled input terminals; (c.) coupling energy from the standby power supply to a generator for a drive signal responsive to the first control signal; (d.) transmitting a second control signal to the generator; (e.) changing the control circuit to a partially active polling/wait state, while continuing to generate the first control signal; (f.) initiating operation of the drive signal generator responsive to the second control signal; (g.) initiating operation of a run mode power supply responsive to the drive signal; and, (h.) substituting the run power supply for the standby power supply as an energy source for the generator.

The method further comprise the step of depleting energy from an auxiliary energy source during an interval between steps (c.) and (e.), when the generator and the control circuit are both energized by the standby power supply at the same time.

The method may also further comprise the steps of: (i.) monitoring operation of the run power supply; and, (j.) returning the control circuit to the active state when full operation of the run power supply is detected.

In alternative embodiments, step (f.) may precede step (e.) or steps (e.) and (f.) may occur substantially simultaneously.

Steps (a.), (b.), (d.) and (e.) may be implemented with a microprocessor. Step (c.) may be implemented with a switch responsive to the command signal. Step (h.) may be implemented with a blocking diode.

DETAILED DESCRIPTION OF THE PREFERRED EMBODIMENTS

Figure 1:
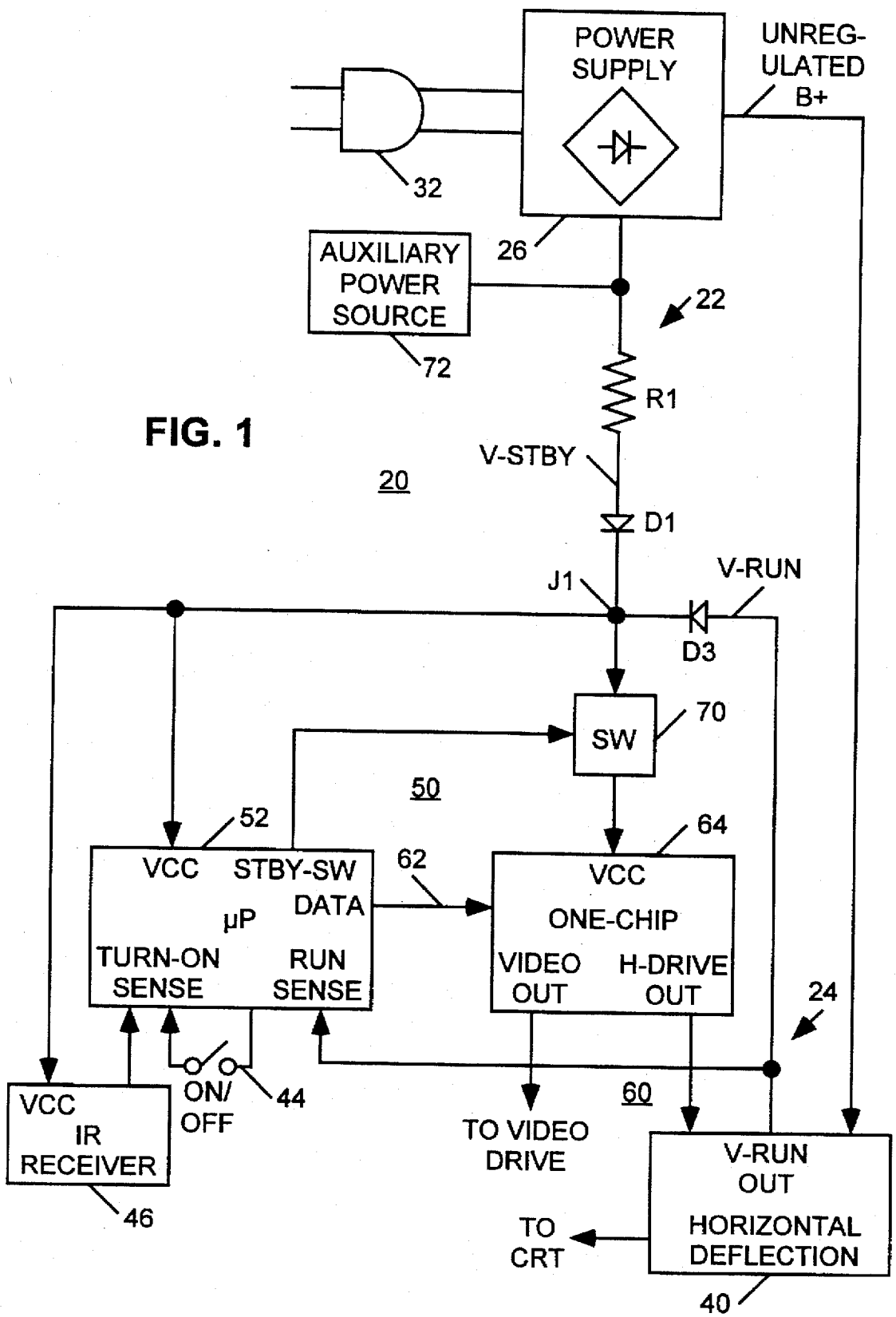
FIG. 1 is a functional block diagram illustrating the circuit apparatus according to one embodiment of the invention.
Figure 2:
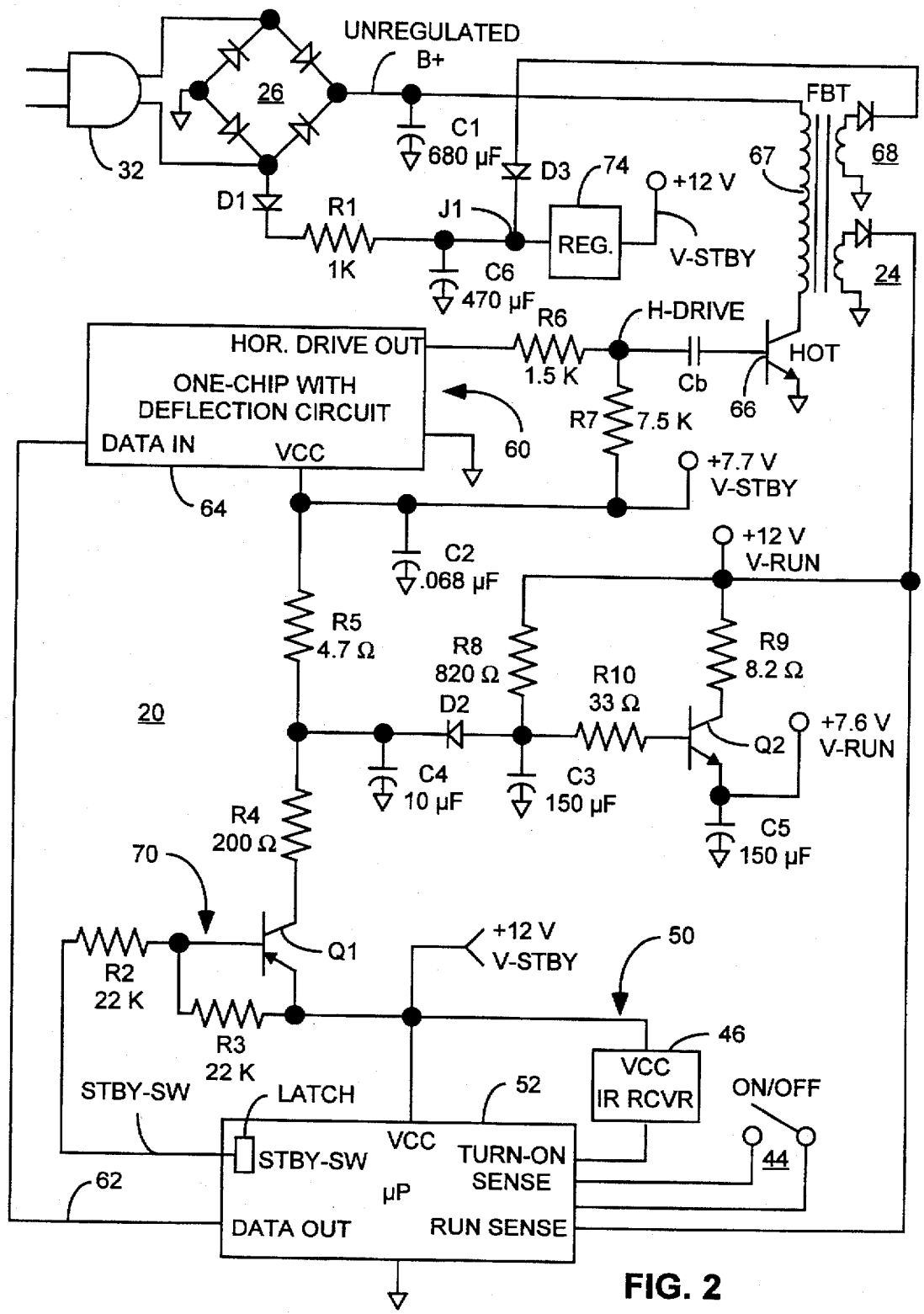
FIG. 2 is a schematic diagram showing the invention as applied to a television apparatus having a microprocessor controller and one-chip video decoder/driver.

A circuit apparatus such as a television receiver 20, having a run mode and a standby mode, is shown in FIG. 1. Power supplies 22, 24 for the standby mode and the run mode, respectively, are coupled to a bridge rectifier 26 that is energized so long as power is available from the AC power mains 32, e.g., via a wall plug. Rectifier 26 generates from the AC power a full wave rectified B+ voltage. A o rectified standby supply voltage V-STBY is also generated from the AC power, for example at 12 volts. The standby supply voltage can be developed from bridge rectifier 26 as shown in FIG. 2, or by other means known in the art. FIG. 1 illustrates a current limiting resistor R1 and a blocking diode D1. The standby power is available at a junction J1.

In FIG. 2, which represents a particular implementation of the circuit shown functionally in FIG. 1, the same reference numbers have been used to identify corresponding elements.

The B+ voltage is coupled to the beam deflection circuits 40, o namely to the primary winding of a flyback transformer 67 (not shown in FIG. 1). However the B+ voltage is not loaded unless horizontal drive signals are applied to excite the deflection circuits via signal H DRIVE. When deflection circuits 40 are excited, in addition to driving CRT deflection coils (not shown), flyback transformer 67 generates run mode supply voltages on its secondary windings 68, shown in FIG. 2. The run mode supply voltages are rectified and used to power various loads when television 20 is operational, but are only present when the apparatus is producing horizontal drive signals, i.e., only in the run mode.

Input means including an on/off panel switch 44, and/or an infrared receiver 46 responsive to a hand held remote controller (not shown), are operated by a user to produce a command signal representing an on/off operational command, which is interpreted as a command to switch between standby mode and run mode. The input means are coupled to a control circuit 50 for monitoring input means 44, 46 for a change in the command signal for switching from the standby mode to the run mode. The control circuit 50 may comprise a microprocessor 52 and switching means 70. Microprocessor 52 also effects additional control functions. Input means 44, 46 and microprocessor 52 are powered from the standby supply voltage V-STBY in the standby mode. Accordingly, power is applied to microprocessor 52 and input means 44, 46 whenever the television is connected to operating power mains, as needed to monitor for a command to turn the device on.

The control circuit microprocessor 52 can operate, for example, in a polling mode during operation, wherein the status of the input means is checked substantially less frequently than would be possible by continuously operating microprocessor 52 in a status checking loop. In the standby mode, polling can be triggered on a low frequency schedule such as once per second, by an interrupt or the like that causes microprocessor 52 to check the status of input means, for example means 44, 46 and RUN SENSE, and then to become inactive if the input means does not indicate that a command has been made to turn on. Timing means or the like (not shown) can be provided external to microprocessor 52 for triggering polling, or timing can be a programmed feature of the polling routine.

When a command is received to turn on, microprocessor 52 processes data received from input means, in particular infrared receiver 46, and communicates with video processing circuits 60 to effect various functions such as display selections, tuning selections and the like. A data bus 62 couples microprocessor 52 and video processing circuits 60 for this purpose. However, in the standby mode the video processing circuits are inactive and unpowered.

The video processing circuits 60 can include a one-chip video processor 64. One-chip circuits generally include a number of constituent circuits for processing video signals including, for example, SIF, VIF, luminance, chrominance and deflection. Sometimes one or more constituent circuits have separate power supply terminals. The deflection circuit will process synchronizing signals and derive horizontal and vertical drive signals. The drive signals include a horizontal drive signal H-DRIVE coupled to horizontal deflection circuit 40 which drives beam deflection and also provides the run supply voltages. As shown in detail in FIG. 2, the H-DRIVE signal can be coupled to the horizontal output transistor 66 that excites the primary winding of flyback transformer 67. Secondary windings 68 of the flyback transformer produce the run mode supply voltages.

According to an inventive arrangement, a switching means 70 is responsive to an output STBY-SW signal from microprocessor 52 of control circuit 50 for controllably coupling current from the output V-STBY of standby mode power supply 22 to power one-chip circuit 64 when a command is received to switch from the standby mode into the run mode. More particularly, standby power is supplied to the one-chip 64 by switching means 70. After the one-chip is energized and initialized, the microprocessor 52 transmits a control signal to the one-chip, for example over a data bus, to initiate operation of the drive signal generator. If the one-chip has a deflection circuit with an independent VCC input, switching means 70 will be coupled to the corresponding VCC terminal associated with the deflection circuit. When the control signal is initially transmitted to the one-chip circuit, a short time elapses before the drive circuit begins to output horizontal rate pulses on signal H-DRIVE. The microprocessor assumes a low power consumption polling/wait state after transmitting the control signal. The STBY-SW signal is set by a latch which remains latched in the low power polling/wait state. Accordingly, there is a brief interval during which the microprocessor 52 and the one-chip 64 are both active in the standby mode and energized by the standby power supply. Such a load can be too large for the standby power supply. In this case, an auxiliary power supply 72, which may be a storage capacitor as shown in FIG. 2, can be depleted to supply additional energy during the brief interval. The term brief is defined herein as the duration of the time interval between transmission of the STBY-SW signal and assumption of the polling/wait state. This time will vary with the particular microprocessor and overall circuit design, but the meaning of the term is clear within the context of this description.

Microprocessor 52 has a RUN-SENSE input, polled by the microprocessor in the low power consumption polling mode assumed after transmission of the control signal to initiate the drive signal generator. The RUN-SENSE input is coupled to one of the run mode supplies, shown generally in FIG. 1 as V-RUN. This run mode supply (or a run mode supply derived from rectifying one of the other secondary windings of the flyback transformer), is coupled to the junction J1 by blocking diode D3. When the H-DRIVE signal is produced and the V-RUN voltage is generated, power is supplied substantially by run mode supply rather than the standby supply. The voltage level of V-RUN will be sufficiently higher than V-STBY to back bias diode D1. Diode D3 is back biased by V-STBY when no run power is available After a short time of polling during the transition from standby mode to run mode, the RUN-SENSE input is found by microprocessor 52 to be true. Microprocessor 52 then initializes for operation in the run mode, and commences communicating the necessary tuning selections and the like to receiver circuits on the data bus 62. The sequence of events is such that microprocessor 52 and driver circuit 64 are both fully powered from the standby supply 22 only during a brief interval. Standby supply 22 does not need enough capacity to energize both the microprocessor and the one-chip at the same time, provided that an inexpensive auxiliary and temporary power source can be tapped, for example a storage capacitor which is charged by standby power during the standby mode and remains charged until needed.

FIG. 2 illustrates a presently preferred embodiment of the invention shown functionally in FIG. 1. In FIG. 2, video driver 60 includes a one-chip video decoder/driver integrated circuit such as the Sanyo LA7612. Control circuit 50 comprises a microprocessor 52, such as industry type ST9294. Both microprocessor 52 and video driver circuit 64 perform a number of functions in addition to the functions shown, and the external circuits supporting such additional functions have been omitted from the drawings for clarity. In addition to the positive power supply input VCC, coupled to the standby supply voltage V-STBY, the microprocessor inputs include the inputs from infrared receiver 46 (which is also powered from V-STBY), a front panel switch 44, and the RUN-SENSE signal from a rectified secondary winding 68 of flyback transformer 67, which forms run mode power supplies 24 and 68. The microprocessor outputs include signal STBY-SW, which in this embodiment is set or cleared by an output of microprocessor 52 that remains latched when microprocessor 52 is in the low power polling mode. Signal STBY-SW is coupled to the base of a PNP switching transistor Q1, whose emitter is coupled to the standby supply voltage V-STBY, for example at +12 volts DC. Resistors R2 and R3 bias transistor Q1, which functions as a current switch. Transistor Q1 is disposed in series with the standby mode power supply 22 and the STBY-VCC input of one-chip circuit 64, including through resistors R4 and R5, for coupling standby mode power supply 22 to driver circuit 64 during the transition into the run mode.

Provided AC power is available at power mains 32, the unregulated B+ voltage is available via bridge rectifier 26 and filter capacitor C1. In this embodiment, +12 volt standby power is provided at V-STBY by a series regulator 74 coupled to a half-wave tap of bridge rectifier 26 by current limiting resistor R1 and diode D1. In the standby mode, standby power supply 22 powers microprocessor 52 and input means 44, 46, but signal STBY-SW is high, and transistor Q1 is switched off, decoupling the deflection circuit of one-chip 64 from V-STBY. Therefore, output signal H-DRIVE from video driver is inactive; horizontal output transistor 66 does not conduct; and run mode power supplies 24 and 68 are off.

Upon commencing the transition into the run mode, microprocessor 52 latches signal STBY-SW low and transistor Q1 is switched on to couple the V-STBY output of standby power supply 22 through resistors R4 and R5 to the STBY-VCC power supply input of video driver 64. This input includes a band-gap element that substantially regulates the voltage, for example to+7.6 volts, which voltage is filtered by capacitors C2 and C4. The deflection driver of circuit 64 begins to output pulses on signal H-DRIVE, responsive to the control signal from the microprocessor transmitted on the data bus, through series resistor R6. Resistors R6 and R7 and blocking capacitor Cb represent buffer and driver stages for horizontal output transistor 66, which are omitted for purposes of clarity. Horizontal deflection signals are then generated and coupled to the secondary windings 68 of flyback transformer 67, including the secondary winding of run mode supply 24, which is rectified to provide +12 volts at signal V-RUN. In the standby mode, diode D3 is reverse biased to block current for standby power supply 22 from attempting to power the run supply 68.

Transistor Q2 forms a regulator that maintains a +7.6 volt output, charging capacitor C5 through resistor R9, coupled to the +12 volt run power supply. The base of transistor Q2 is coupled to the STBY-VCC input of video driver 64 through resistor R10, diode D2 and resistor R5. The self regulated bandgap voltage at one-chip 64 regulates the voltage on the emitter of transistor Q2 because the diode voltage drops across diode D2 and across the base-emitter junction of transistor Q2 cancel one another. Capacitor C5 is charged to +7.6 volts and is available to power other run mode loads (not shown).

After switching on transistor Q1 via the STBY-SW output, and transmitting the control signal, microprocessor 52 operates in the low power polling/wait state. When the voltage on run mode supply 24 comes up, the microprocessor detects this at its RUN-SENSE input, and initializes for operation in the run mode. At this point, power is delivered to junction J1 by diode D3. Run mode power therefor substantially substitutes for the standby power supply in the run mode.

In accordance with an inventive arrangement, the standby power supply has insufficient capacity to energize both the microprocessor and the one-chip during the brief interval between supplying standby power to the one-chip and having the microprocessor assume the low power polling/wait state after transmitting the control signal. Additional energy during this brief interval is supplied by the charge on capacitor C6. By the time the charge has depleted, the microprocessor has assumed the low power mode.

FIGS. 3(a)–3(f) illustrate the relative timing, not to scale, of the respective signals and operating conditions of the various components and power supplies explained above. FIG. 4 is a flow chart showing the operation of the microprocessor, with most of the steps keyed to the time events of FIGS. 3(a)–(f). The following explanation is made with reference to both drawings.

Figure 3:
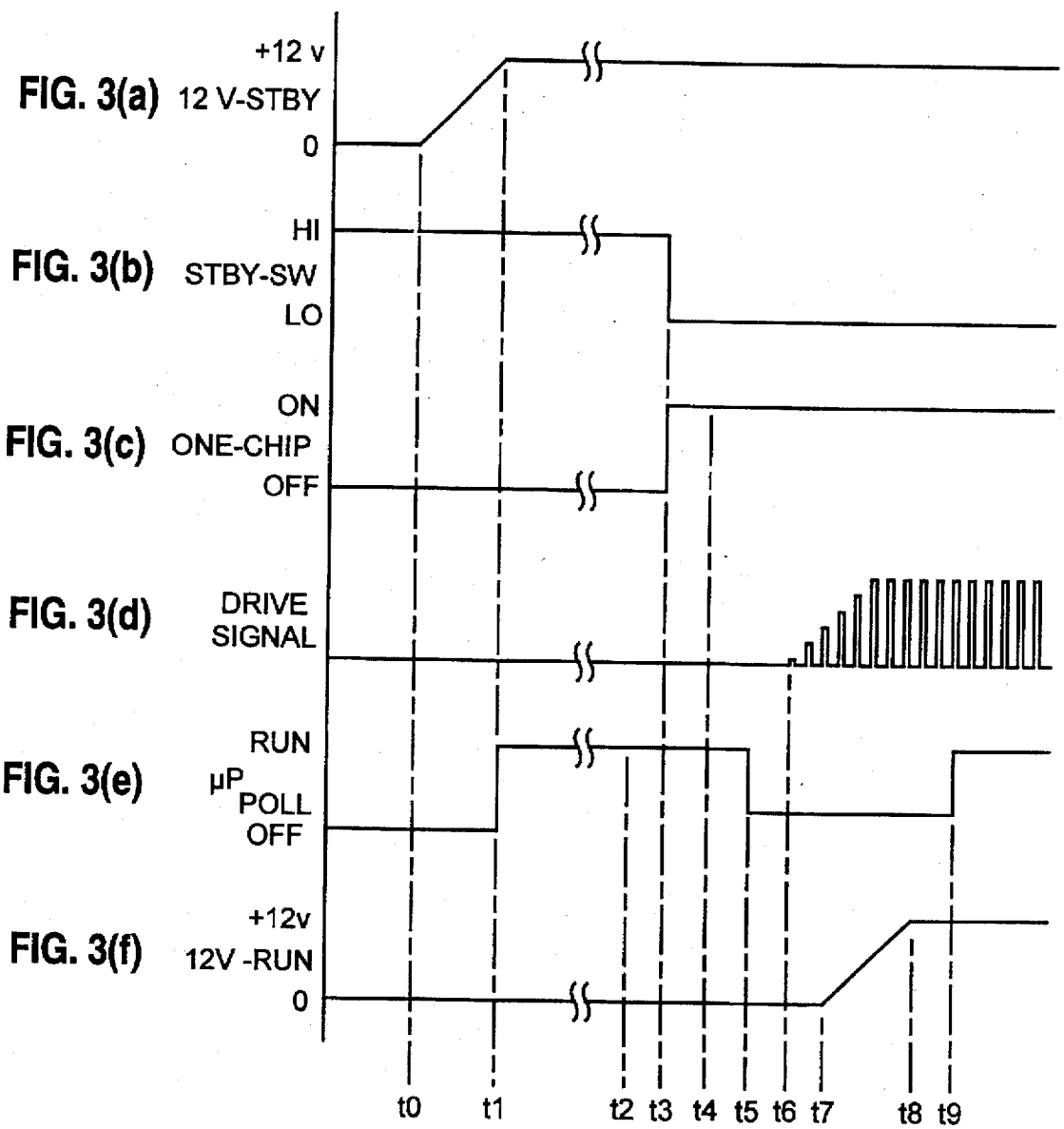
FIG. 3(a)–3(f) are a timing diagram useful for explaining the operation of the circuits shown in FIGS. 1 and 2 and the flow chart shown in FIG. 4.
Figure 4:
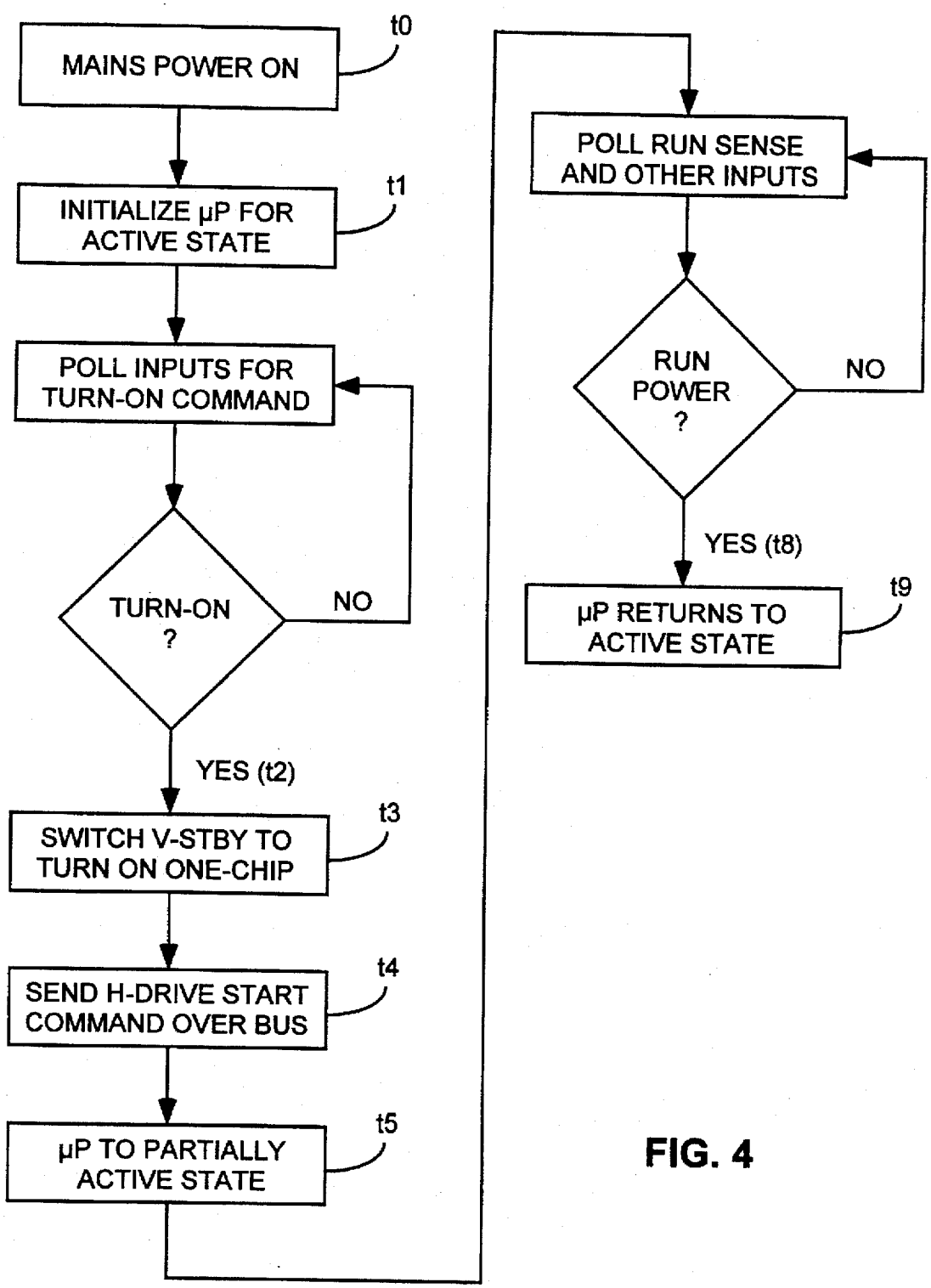
FIG. 4 is a flow chart showing a preferred method of operation of the microprocessor shown in the circuits of FIGS. 1 and 2.

AC power is available at the power mains 32 at time t0, and standby power supply 22 becomes active immediately, reaching an operating level at time t1, as shown in FIG. 3(a). Microprocessor 52 initializes itself into an active (RUN) state, as shown in FIG. 3(e). Signal STBY-SW is high as shown in FIG. 3(b), so that transistor Q1 is off and one-chip 64 is unpowered.

Microprocessor 52 polls its input means 44, 46 for a command to run. When the input means are activated at time t2, for example in response to a power on signal from a remote control, microprocessor 52 responds by latching signal STBY-SW low at time t3. Transistor Q1 is turned on, which couples the standby power supply to the one-chip circuit 64. After one-chip 64 has an opportunity to achieve a normal operating condition, microprocessor 52 transmits a control signal to the one-chip at time t4 to initiate operation of the drive signal generator. Microprocessor 52 then assumes the partially active state at time t5, but continues to poll its inputs in the low power consumption mode. The latched STBY-SW signal remains latched after the microprocessor returns to the partially active state. One-chip 64 may reset by turning off, then on again, to avoid starting in an indeterminate state. Such resetting is omitted from FIG. 3(c) for clarity. At time t6, one-chip 64 begins to output a signal a drive signal, as shown in FIG. 3(d). The run supplies 24 and 68 become active at time t7, as shown in FIG. 3(f), reaching an operating level at time t8. Shortly thereafter at time t9, microprocessor 52 finds during polling that the RUN-SENSE input is true, and returns to operation in the fully active state, including initializing its registers and signaling over data bus 62 as well as any additional run mode functions.

Depending upon the operating characteristics of the particular microprocessor and one-chip, or other kind of drive signal generator, the events which are shown as occurring at times t5 and t6, namely initiating the horizontal drive signal and having the microprocessor assume the low power state, may occur in opposite order or at substantially the same time.

The sequenced apportioning of standby power between video driver 64 and microprocessor 52 can be accompanied with additional functions, such as muting the audio output, control of the vertical drive, beam blanking, screen degaussing and the like, for orderly startup in the run mode without audible noise, visible scanning lines and the like. The transition from the start command at inputs 44, 46 to a fully operational state can be complete, for example, in about 1.7 seconds.

In accordance with the inventive arrangements taught herein, a method and apparatus for apportioning standby power implements a first transition mode between standby and run modes of operation in which a control circuit is energized by a standby power supply in a fully active state and generates an on/off command signal responsive to detection of an input signal and a second transition mode between the standby and run modes of operation in which the control circuit is energized by the standby power supply in a partially active state and generates the on/off command signal and a drive signal generator is fully energized by the standby supply. An intermediate transition mode may also be implemented between the first and second transition modes, in which the control circuit and the generator are both energized in a fully active state for a brief interval by the standby power supply and an auxiliary energy source. The power requirements for a standby power supply are thus minimized and apportioned between microprocessor and one-chip. The one transient peak load which can be anticipated in transitioning from the standby mode to the run mode, which may be in excess of the capacity of the standby power supply, can be easily accommodated with a simple and inexpensive auxiliary energy source which is charged by the standby power supply itself when energy is available. The expense of the auxiliary energy source is less than the cost of increasing the capacity of the standby power supply to accommodate the peak transient load, and results in reduced dissipation losses over the entire operational lifetime of the apparatus.

What is claimed is:

1. A system for apportioning standby power, comprising:
  a drive signal generator for generating a drive signal in response to an on/off command signal;
  a run mode power supply operable in response to said drive signal;
  a standby power supply; and,
  a control circuit for generating said on/off command responsive to an input signal;
  said control circuit implementing a first transition mode between standby and run modes of operation in which said control circuit is energized by said standby power supply in an active state and generates said on/off command signal; and
  a second transition mode between said standby and run modes of operation in which said control circuit is energized by said standby power supply in a partially active polling/wait state and generates said on/off command signal and said drive signal generator is fully energized by said standby supply.

2. The system of claim 1, wherein said control circuit implements an intermediate transition mode, from said first transition mode to said second transition mode, in which said control circuit and said generator are both energized in a fully active state for a brief interval.

3. The system of claim 2, wherein said standby power supply comprises an auxiliary energy source for supplying additional energy to said control circuit and to said generator during said intermediate transition mode.

4. The system of claim 3, wherein said auxiliary energy source comprises a capacitor.

5. The system of claim 1, wherein said control circuit comprises a latch which can be maintained in both said first and second transition modes.

6. The system of claim 1, wherein said control circuit comprises a switch coupling said standby power supply to said generator responsive to said on/off command signal.

7. The system of claim 1, wherein said control circuit comprises a microprocessor having:

at least one input terminal coupled for receiving said input signal, when present; and, a latched output, which can be maintained in said partially active state, for generating said on/off command signal.

8. The system of claim 1, wherein said control circuit comprises:

a microprocessor, having at least one input terminal coupled for receiving said input signal, when present, and having a latched output, which can be maintained in said partially active state, for generating said on/off command signal; and, a switch coupling said standby power supply to said generator responsive to said on/off command signal.

9. A method for transitioning from a standby mode of operation to a run mode of operation, comprising the steps of:

(a.) polling input terminals of a control circuit energized by a standby power supply and operating in an active state;

(b.) generating a first control signal responsive to a detected signal at one of said polled input terminals;

(c.) coupling energy from said standby power supply to a generator for a drive signal responsive to said first control signal;

(d.) transmitting a second control signal to said generator;

implementing each one of a step (e.) and a step (f.) in one of three sequences: step (e.) proceding step (f.) in a second one said three sequences: step (e.) preceding step (f.) in a first one of said three sequences; and, steps (e.) and (f.) occurring at the same time in a third one of said three sequences, wherein step (e.) is changing said control circuit to a partially active polling/wait state, while continuing to generate said first control signal; and, step (f.) is initiating operation of said drive signal generator responsive to said second control signal;

(g.) initiating operation of a run mode power supply responsive to said drive signal; and, (h.) substituting said run power supply for said standby power supply as an energy source for said generator.

10. The method of claim 9, further comprising the steps of:

(i.) monitoring operation of said run power supply; and, (j.) returning said control circuit to said active state when full operation of said run power supply is detected.

11. The method of claim 9, further comprising the step of depleting energy from an auxiliary energy source during an interval between steps (c.) and (e.), when said generator and said control circuit are both energized by said standby power supply at the same time.

12. The method of claim 9, comprising the step of implementing steps (a.), (b.), (d.) and (e.) with a microprocessor.

13. The method of claim 9, comprising the step of implementing step (c.) with a switch responsive to said first control signal.

14. The method of claim 9, comprising the step implementing step (h.) with a blocking diode.

15. The method of claim 9, comprising the steps of:

implementing steps (a.), (b.), (d.) and (e.) with a microprocessor;

implementing step (c.) with a switch responsive to said command signal; and, implementing step (h.) with a blocking diode.

* * * * *